United States Patent
Oya et al.

(10) Patent No.: US 9,989,420 B2
(45) Date of Patent: *Jun. 5, 2018

(54) TEMPERATURE SENSITIVE ELEMENT AND TEMPERATURE SENSOR

(71) Applicant: NGK SPARK PLUG CO., LTD., Nagoya-shi, Aichi-ken (JP)

(72) Inventors: Seiji Oya, Niwa-gun (JP); Toshiya Oya, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 328 days.

This patent is subject to a terminal disclaimer.

(21) Appl. No.: 14/699,383

(22) Filed: Apr. 29, 2015

(65) Prior Publication Data
US 2015/0316422 A1 Nov. 5, 2015

(30) Foreign Application Priority Data
May 1, 2014 (JP) ................... 2014-094676

(51) Int. Cl.
*G01K 7/16* (2006.01)
*G01K 13/02* (2006.01)

(52) U.S. Cl.
CPC .......... *G01K 7/16* (2013.01); *G01K 13/02* (2013.01); *G01K 2013/024* (2013.01); *G01K 2205/04* (2013.01)

(58) Field of Classification Search
CPC ........ G01K 7/18; G01K 2205/04; G01K 1/12; G01K 7/02; G01K 7/10; G01K 7/22;
(Continued)

(56) References Cited

U.S. PATENT DOCUMENTS 6,207,905 B1 * 3/2001 Taga ................ C03C 3/108
174/255
2009/0034157 A1 * 2/2009 Saito ................ H01G 4/0085
361/321.4
(Continued)

FOREIGN PATENT DOCUMENTS

DE 4334438 A1 4/1995
JP H5-34205 A 2/1993
(Continued)

OTHER PUBLICATIONS

Japan Patent Office, Office Action (Notification of Reason for Rejection) issued in corresponding Application No. JP2014-094676, dated Jul. 4, 2017.
(Continued)

*Primary Examiner* — Manish S Shah
(74) *Attorney, Agent, or Firm* — Stites & Harbison, PLLC; Jeffrey A. Haeberlin; James R. Hayne

(57) ABSTRACT

A temperature sensitive element in a temperature sensor includes a covering member formed from alumina and aluminosilicate glass, and the volume ratio of the alumina to the aluminosilicate glass (the alumina/the aluminosilicate glass) in the covering member is 30 vol %/70 vol %. The aluminosilicate glass contained in the covering member is high heat-resistant glass having a softening point of 900° C. or higher. The covering member can hold output lines and pads and can restrain separation of the output lines from the pads and separation of the pads from a ceramic substrate even in an environment of higher temperature as compared with the case where the covering member is formed of the aluminosilicate glass only.

5 Claims, 9 Drawing Sheets

| | CERAMIC COMPONENT | AMOUNT OF CERAMIC [vol%] | GLASS COMPONENT | AMOUNT OF GLASS [vol%] | INITIAL STRENGTH | POST-ENDURANCE TEST STRENGTH |
|---|---|---|---|---|---|---|
| SAMPLE 1 | | 0 | | 100 | AA | X |
| SAMPLE 2 | | 3 | | 97 | AA | A |
| SAMPLE 3 | | 10 | | 90 | AA | AA |
| SAMPLE 4 | | 20 | | 80 | AA | AA |
| SAMPLE 5 | ALUMINA | 30 | | 70 | AA | AA |
| SAMPLE 6 | | 40 | | 60 | AA | AA |
| SAMPLE 7 | | 50 | | 50 | A | AA |
| SAMPLE 8 | | 60 | ALUMINOSILICATE GLASS | 40 | X | — |
| SAMPLE 9 | | 0 | | 100 | AA | X |
| SAMPLE 10 | | 3 | | 97 | AA | A |
| SAMPLE 11 | | 10 | | 90 | AA | AA |
| SAMPLE 12 | | 20 | | 80 | AA | AA |
| SAMPLE 13 | CORDIERITE | 30 | | 70 | AA | AA |
| SAMPLE 14 | | 40 | | 60 | AA | AA |
| SAMPLE 15 | | 50 | | 50 | A | AA |
| SAMPLE 16 | | 60 | | 40 | X | |

(58) Field of Classification Search
CPC ........ G01K 11/32; G01K 13/00; G01K 13/02; G01K 2013/024; G01J 5/004; G01J 5/043; G01J 5/081; H01R 4/023; H01R 4/029; H01R 43/28; B23K 31/02; H01C 7/008; H01C 1/14; H01C 17/00
See application file for complete search history.

(56) References Cited

U.S. PATENT DOCUMENTS

| | | |
|---|---|---|
| 2012/0082181 A1 | 4/2012 | Alnaqash et al. |
| 2013/0223479 A1 | 8/2013 | Satou et al. |

FOREIGN PATENT DOCUMENTS

| | | | | |
|---|---|---|---|---|
| JP | 2006-234632 A | | 9/2006 | |
| JP | 2006234632 A | * | 9/2006 | ............... G01K 7/18 |
| JP | 2007-187562 A | | 7/2007 | |
| JP | 2011-89859 A | | 5/2011 | |
| JP | 2011-247876 A | | 12/2011 | |
| JP | 2013-147600 A | | 8/2013 | |
| JP | 2014-6283 A | | 1/2014 | |
| WO | 97/33329 A1 | | 9/1997 | |
| WO | WO 2010118813 A1 | * | 10/2010 | ............... G01K 7/18 |

OTHER PUBLICATIONS

Japan Patent Office, Notification of Third Party Submission issued in corresponding Application No. JP2014-094676, dated Oct. 10, 2017.

Pisit Geasee, "Development of crystallizing glass sealants for high temperature planar solid oxide fuel cells," 2003, PhD Thesis, RWTH Aachen, Logos Verlag Berlin, Germany (translation unavailable, but see English abstract and Notification of Third Party Submission).

Heinz G. Pfaender, "Schott-Glaslexikon," 5th edition, 1997 (translation unavailable, but see: Notification of Third Party Submission).

Hermann Salmang, "Die physikalischen und chemischen Grundlagen der Glasfabrikation," 1957, Springer Verlag, Germany (translation unavailable, but see: Notification of Third Party Submission).

* cited by examiner

| | CERAMIC COMPONENT | AMOUNT OF CERAMIC [vol%] | GLASS COMPONENT | AMOUNT OF GLASS [vol%] | INITIAL STRENGTH | POST-ENDURANCE TEST STRENGTH |
|---|---|---|---|---|---|---|
| SAMPLE 1 | ALUMINA | 0 | ALUMINOSILICATE GLASS | 100 | AA | X |
| SAMPLE 2 | | 3 | | 97 | AA | A |
| SAMPLE 3 | | 10 | | 90 | AA | AA |
| SAMPLE 4 | | 20 | | 80 | AA | AA |
| SAMPLE 5 | | 30 | | 70 | AA | AA |
| SAMPLE 6 | | 40 | | 60 | AA | AA |
| SAMPLE 7 | | 50 | | 50 | A | AA |
| SAMPLE 8 | | 60 | | 40 | X | — |
| SAMPLE 9 | CORDIERITE | 0 | | 100 | AA | X |
| SAMPLE 10 | | 3 | | 97 | AA | A |
| SAMPLE 11 | | 10 | | 90 | AA | AA |
| SAMPLE 12 | | 20 | | 80 | AA | AA |
| SAMPLE 13 | | 30 | | 70 | AA | AA |
| SAMPLE 14 | | 40 | | 60 | AA | AA |
| SAMPLE 15 | | 50 | | 50 | A | AA |
| SAMPLE 16 | | 60 | | 40 | X | — |

FIG. 6

| | CERAMIC COMPONENT | AMOUNT OF CERAMIC [vol%] | GLASS COMPONENT | AMOUNT OF GLASS [vol%] | INITIAL STRENGTH | POST-ENDURANCE TEST STRENGTH |
|---|---|---|---|---|---|---|
| SAMPLE 21 | MAGNESIA | 30 | ALUMINOSILICATE GLASS | 70 | AA | AA |
| SAMPLE 22 | ZIRCON | | | | AA | AA |
| SAMPLE 23 | SPINEL | | | | AA | AA |
| SAMPLE 24 | MULLITE | | | | AA | AA |
| SAMPLE 25 | STEATITE | | | | AA | AA |
| SAMPLE 26 | SILICON CARBIDE | | | | AA | AA |
| SAMPLE 27 | SILICON NITRIDE | | | | AA | AA |
| SAMPLE 28 | ALUMINUM NITRIDE | | | | AA | AA |
| SAMPLE 29 | ALUMINA | | SILICATE GLASS | | AA | AA |
| SAMPLE 30 | | | BORATE GLASS | | AA | AA |
| SAMPLE 31 | | | BOROSILICATE GLASS | | AA | AA |
| SAMPLE 32 | | | PHOSPHOSILICATE GLASS | | AA | AA |
| SAMPLE 33 | CORDIERITE | | SILICATE GLASS | | AA | AA |
| SAMPLE 34 | | | BORATE GLASS | | AA | AA |
| SAMPLE 35 | | | BOROSILICATE GLASS | | AA | AA |
| SAMPLE 36 | | | PHOSPHOSILICATE GLASS | | AA | AA |

FIG. 7

|  | SiO$_2$ [wt%] | CaO [wt%] | MgO [wt%] | Al$_2$O$_3$ [wt%] | ALKALI METAL ELEMENTS [wt%] | JUDGMENT | MEASUREMENT ERROR |
|---|---|---|---|---|---|---|---|
| SAMPLE 41 | 57.0 | 16.0 | 6.0 | 21.0 | 0.0 | — | — |
| SAMPLE 42 | 56.9 | 16.0 | 6.0 | 21.0 | 0.1 | AA | 0.5°C |
| SAMPLE 43 | 56.8 | 16.0 | 6.0 | 21.0 | 0.2 | A | 1°C |
| SAMPLE 44 | 56.7 | 16.0 | 6.0 | 21.0 | 0.3 | X | 2°C |

FIG. 8

TEMPERATURE SENSITIVE ELEMENT AND TEMPERATURE SENSOR

CROSS REFERENCE TO RELATED APPLICATION

The present application claims priority from Japanese Patent Application No. 2014-094676, which was filed on May 1, 2014, the disclosure of which is herein incorporated by reference in its entirety.

BACKGROUND OF THE INVENTION

Field of the Invention

The present invention relates to a temperature sensitive element used for an exhaust system of an internal combustion engine (such as an automobile engine) and to a temperature sensor including the temperature sensitive element.

Description of Related Art

One known temperature sensor used for an exhaust system of an internal combustion engine (such as an automobile engine) is a temperature sensor including a temperature sensitive element with a metallic resistor (e.g., a platinum resistor). This temperature sensor detects the temperature of a measurement object (e.g., a measurement gas) by utilizing a change in the electric resistance of the metallic resistor due to a change in temperature (see Patent Document 1).

One known example of the temperature sensitive element described above is shown in FIG. 9. In this temperature sensitive element, Pt thin-film terminals P3 connected to a platinum resistor P2 are formed on the surface of an alumina substrate P1, and thick-film pads P4 formed of a Pt paste are formed on the surfaces of the thin-film terminals P3. In addition, output lines P5 formed of Pt are connected to the pads P4. The output lines are joined to unillustrated metal core wires, and the pads P4 and the output lines P5 are covered with a covering member P6 formed of glass.

RELATED ART DOCUMENT

Patent Document 1 is Japanese Patent Application Laid-Open (kokai) No. 2006-234632.

BRIEF SUMMARY OF THE INVENTION

The above conventional temperature sensitive element is seldom subjected to regular use at high temperature (for example, 850° C. or higher), and requirements for thermal shock resistance are not severe. Therefore, separation of the output lines P5 from the pads P4 has not been a problem.

However, in recent years, engines are being reduced in size, and this shifts the range of use of temperature sensors to higher temperature. Therefore, the range of temperature change widens, and a large change in thermal expansion due to a large temperature change may lead to the fear of separation of the output lines P5 from the pads P4.

Particularly, when the covering member P6 softens at high temperature, the ability of the covering member P6 to hold the output lines P5 and the pads P4 deteriorates, so that separation of the output lines P5 from the pads P4 occurs easily.

When the output lines P5 are separated from the pads P4, the performance of the temperature sensor deteriorates, and therefore it is important to take measures against the separation.

The present invention has been made in view of the foregoing problem, and it is an object of the invention to provide a temperature sensitive element and a temperature sensor which can reduce the possibility of separation of the output lines from the pads.

According to one aspect of the present invention, a temperature sensitive element comprises a ceramic substrate, a metallic resistor layer formed on the ceramic substrate, a conductive pad formed on the ceramic substrate and electrically connected to the metallic resistor layer, and an output line made of a metal and joined to a surface of the pad. The temperature sensitive element further comprises a covering member.

The covering member is disposed on the pad so as to cover at least a portion of the output line, which portion is located on the pad. The covering member is formed of a mixture of glass and ceramic.

The volume ratio of the ceramic to the glass (the ceramic/the glass) in the covering member is within the range of 3 vol %/97 vol % to 50 vol %/50 vol %. The softening point or melting point of the glass in the covering member is 900° C. or higher.

In the temperature sensitive element of the present aspect, the covering member is configured to include the glass and the ceramic at the volume ratio described above. Therefore, even at a temperature at which the glass softens (or melts), the presence of the ceramic allows the covering member to maintain its shape, when the ceramic does not soften at this temperature. Specifically, this covering member can hold the output line and the pad and can restrain separation of the output line from the pad and separation of the pad from the ceramic substrate even in an environment of higher temperature as compared with the case where the covering member is formed of the glass only.

Since the softening point or melting point of the glass in the covering member is 900° C. or higher, the covering member can hold the output line and the pad at a temperature of 900° C. or higher, so long as the ceramic does not soften at this temperature, and therefore separation of the output line from the pad and separation of the pad from the ceramic substrate can be suppressed.

According to the temperature sensitive element of the present aspect, softening of the covering member can be restrained, and the possibility of separation of the output line from the pad can be reduced.

The above phrase "softening point or melting point of the glass" means the softening point when the glass is amorphous glass, and means the melting point when the glass is crystallized glass. When the glass has both softening point and melting point, the lower one of the softening point and melting point of the glass is employed. Specifically, the lower one of the softening point and melting point of the glass in the covering member is 900° C. or higher. In other words, both the softening point and melting point of the glass are 900° C. or higher.

In accordance with another aspect of the invention, the glass in the covering member may contain an alkali metal element in an amount of 0.2 wt % or less (inclusive of 0 wt %).

If the glass in the covering member contains a large amount of alkali metal element, the electric conductivity of the covering member becomes high. In this case, leakage current may flow through the covering member, so that the possibility of a reduction in the temperature detection accuracy of the temperature sensitive element increases.

However, when the content of the alkali metal element in the glass in the covering member is 0.2 wt % or less (inclusive of 0 wt %) (i.e., the composition of the glass in the covering member includes substantially no alkali metal element), an increase in the electric conductivity of the covering member can be suppressed, so that a reduction in the temperature detection accuracy of the temperature sensitive element can be suppressed.

According to yet another aspect of the invention, the thermal expansion coefficient of the covering member may be equal to or lower than the thermal expansion coefficient of the output line.

In such a temperature sensitive element, since the thermal expansion coefficient of the covering member is equal to or lower than the thermal expansion coefficient of the output line, the amount of expansion of the output line when temperature changes is similar to that of the covering member, or the amount of expansion of the covering member is smaller than that of the output line.

Therefore, even in a high temperature environment, the covering member is less likely to deform than the output line and can hold the output line and the pad, so that separation of the output line from the pad and the separation of the pad from the ceramic substrate can be suppressed.

According to a further aspect of the invention, the volume ratio of the ceramic to the glass (the ceramic/the glass) in the covering member may be within the range of 10 vol %/90 vol % to 40 vol %/60 vol %.

By defining the volume ratio of the ceramic to the glass (the ceramic/the glass) in the covering member as described above, the presence of the ceramic further allows the covering member to maintain its shape even in a high temperature environment. This covering member can more securely hold the output line and the pad even in an environment of high temperature, and therefore separation of the output line from the pad and separation of the pad from the ceramic substrate can be restrained.

According to another aspect of the present invention, a temperature sensor comprises a temperature sensitive element as described above, a holding portion for holding the temperature sensitive element, and a mounting portion for mounting the temperature sensitive element and the holding portion to a mount portion.

Even when this temperature sensor is used at a high temperature of, for example, 850° C. or higher, softening of the covering member can be restrained, and the occurrence of separation in the temperature sensitive element can be restrained. Therefore, the temperature sensor has an advantage in that it has high high-temperature endurance and can be preferably used at high temperature.

In the temperature sensitive element of the present invention, softening of the covering member can be restrained, and the possibility of separation of the output line from the pad can be reduced.

In the temperature sensor of the present invention, softening of the covering member can be restrained, and separation of the output line from the pad in the temperature sensitive element can be restrained. Therefore, the temperature sensor has high high-temperature endurance and can be preferably used at high temperature.

BRIEF DESCRIPTION OF THE DRAWINGS

Illustrative aspects of the invention will be described in detail with reference to the following figures wherein:

FIG. 6 shows the results of a measurement test for determining the output line holding strength of a covering member of each of temperature sensitive elements of samples 1 to 16.

FIG. 7 shows the results of the measurement test for determining the output line holding strength of a covering member of each of temperature sensitive elements of samples 21 to 36.

FIG. 8 shows the results of a measurement test for determining the relation between the content of alkali metal elements in glass in a covering member and leakage current in each of temperature sensitive elements.

DETAILED DESCRIPTION OF EXEMPLARY EMBODIMENTS OF THE INVENTION

Embodiments to which the present invention is applied will next be described with reference to the drawings.

In the following embodiments, a temperature sensor attached to a flow pipe such as an exhaust pipe of an internal combustion engine, thereby disposed in the flow pipe through which a measurement target gas flows, and used to detect the temperature of the measurement target gas (exhaust gas) will be described as an example.

1. First Embodiment 1-1. Overall Structure

The overall structure of a temperature sensor 1 of the present embodiment will be described with reference to FIG. 1.

Figure 1:
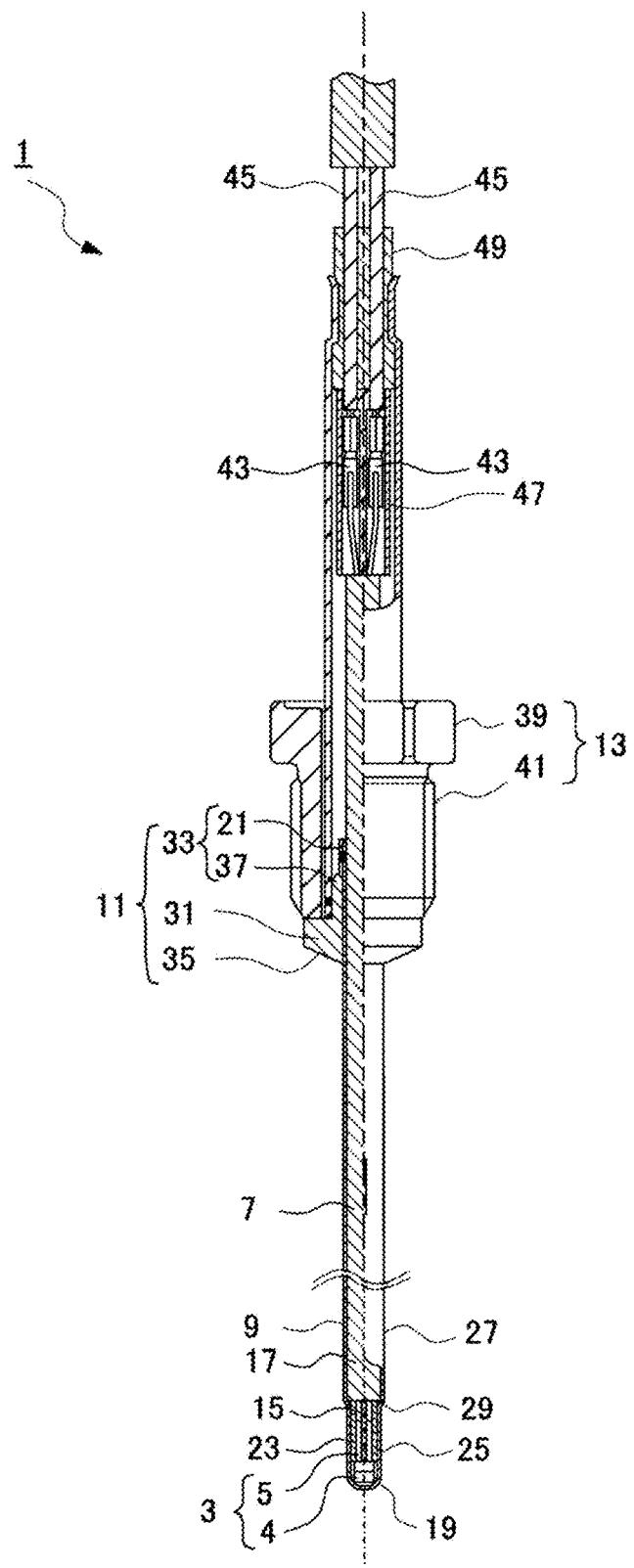
FIG. 1 is a partially cutaway cross-sectional view illustrating the structure of a temperature sensor.

FIG. 1 is a cross-sectional view illustrating the internal structure of the temperature sensor 1. In this figure, the lengthwise direction of the temperature sensor 1 (the vertical direction in FIG. 1) is an axial direction. A forward end side of the temperature sensor 1 is the lower side in FIG. 1, and the rear end side is the upper side in FIG. 1.

The temperature sensor 1 mainly includes a temperature sensitive element 3, a sheath portion 7, a metal tube 9, a mounting portion 11, and a nut portion 13.

The temperature sensitive element 3 is a temperature detecting element disposed in a flow pipe through which a measurement target gas flows and is disposed inside the metal tube 9.

The temperature sensitive element 3 includes: a temperature sensitive portion 4 including an internal metallic resistor having an electric characteristic (electric resistance value) that varies with temperature; and a pair of output lines 5 (element electrode lines 5) connected to the temperature sensitive portion 4, as will be described later in detail.

The sheath portion 7 holds a pair of metal core wires 15 (sheath core wires 15) inside a sleeve 17 in an insulated condition. The sheath portion 7 includes the sleeve 17 made of a metal, the pair of metal core wires 15 made of a conductive metal, and insulating powder (not shown) that holds the two metal core wires 15 so as to electrically insulate the sleeve 17 and the two metal core wires 15 from each other.

The metal tube 9 is a tubular member extending in the axial direction and having a closed forward end and is formed of a corrosion-resistant metal (for example, a stainless steel alloy such as SUS310S, which is also a heat resistant metal).

The metal tube 9 is formed by deep-drawing a steel plate into the shape of a tube extending in the axial direction such that its forward end 19 (bottom) is closed and its rear end is open. The axial dimension of the metal tube 9 is set such that the rear end of the tube abuts against the inner surface of a second step portion 21 of the mounting portion 11.

In addition, the temperature sensitive element 3 and cement 23 (a holding member 23) are disposed inside the metal tube 9. The metal tube 9 has a small-diameter portion 25 formed at its forward end, and a large-diameter portion 27 larger in diameter than the small-diameter portion 25 is formed rearward of the small-diameter portion 25. The small-diameter portion 25 and the large-diameter portion 27 are connected through a step portion 29.

The cement 23 fills the space around the temperature sensitive element 3 and holds the temperature sensitive element 3 to prevent it from vibrating. The cement 23 used is preferably a material having high thermal conductivity, high heat resistance, and high insulating performance.

The cement used is preferably cement formed mainly of an oxide such as $Al_2O_3$ or MgO, a nitride such as AlN, TiN, $Si_3N_4$, or BN, or a carbide such as SiC, TiC, or ZrC or cement formed mainly of an oxide such as $Al_2O_3$ or MgO, a nitride such as AlN, TiN, $Si_3N_4$, or BN, or a carbide such as SiC, TiC, or ZrC and mixed with an inorganic binder such as $Al_2O_3$, $SiO_2$, or MgO.

The mounting portion 11 is a member for supporting the metal tube 9 and surrounds a rear end portion of the outer circumferential surface of the metal tube 9 to support the metal tube 9 with at least the forward end of the metal tube 9 exposed to the outside. The mounting portion 11 includes a protruding portion 31 protruding radially outward and a rear sheath portion 33 located rearward of the protruding portion 31 and extending in the axial direction.

The protruding portion 31 is an annular member including a mounting seat 35 provided on the forward end side. The mounting seat 35 is a tapered member having a diameter decreasing toward the forward end side, and this tapered shape conforms to a tapered shape formed at a sensor mounting position of an exhaust pipe (not shown) and having a diameter increasing toward the rear end side.

When the mounting portion 11 is disposed at the sensor mounting position of the exhaust pipe, the mounting seat 35 comes into contact with the tapered portion of the sensor mounting position, and leakage of the exhaust gas to the outside of the exhaust pipe is thereby prevented.

The rear sheath portion 33 is a member formed into an annular shape, and has a first step portion 37 located on the forward end side and the second step portion 21 smaller in outer diameter than the first step portion 37.

The nut portion 13 includes a hexagonal nut portion 39 and a threaded portion 41.

The metal core wires 15 have forward end portions electrically connected at their welding points (joint portions: not shown) to the output lines 5 of the temperature sensitive element 3, and the rear end portions of the metal core wires 15 are connected to crimp terminals 43 by resistance welding. Specifically, the metal core wires 15 are connected at their rear ends to connection lead wires 45 of an external circuit such as an electronic control unit (ECU) of a vehicle through the crimp terminals 43.

The pair of metal core wires 15 are insulated from each other by an insulating tube 47, and the pair of crimp terminals 43 are insulated from each other also by the insulating tube 47. Each of the lead wires 45 is a conducting wire coated with an insulating coating and is disposed to extend through the inside of a heat resistant rubber-made auxiliary ring 49.

1-2. Temperature Sensitive Element

The structure of the temperature sensitive element 3 will next be described.

Figure 2A:
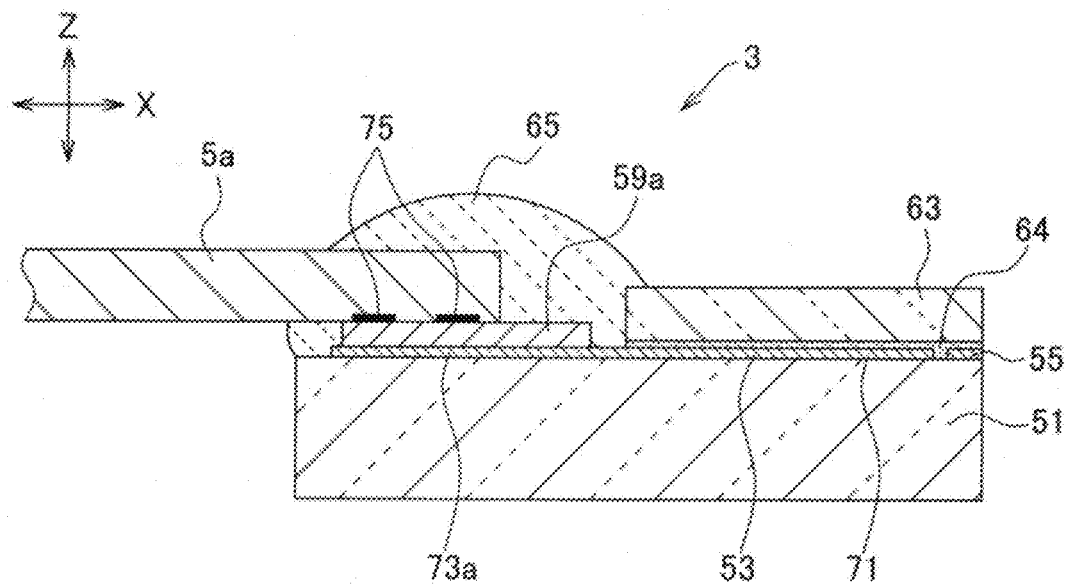
FIG. 2(a) is a cross-sectional view of a temperature sensitive element shown in FIG. 2(b) taken along line A-A.
Figure 2B:
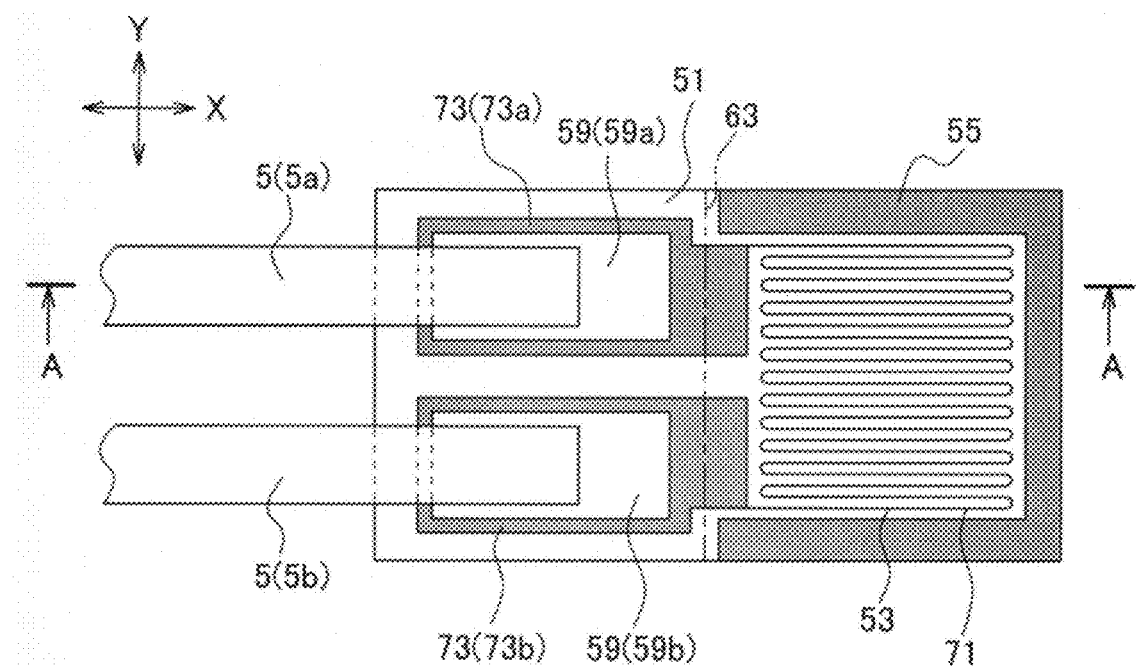
FIG. 2(b) is a plan view illustrating the structure of the temperature sensitive element.

FIG. 2(a) is a cross-sectional view of the temperature sensitive element shown in FIG. 2(b) taken along line A-A, and FIG. 2(b) is a plan view illustrating the structure of the temperature sensitive element. In FIG. 2(b), the temperature sensitive element is shown with a covering member removed and with a ceramic covering layer illustrated as transparent.

Figure 3:
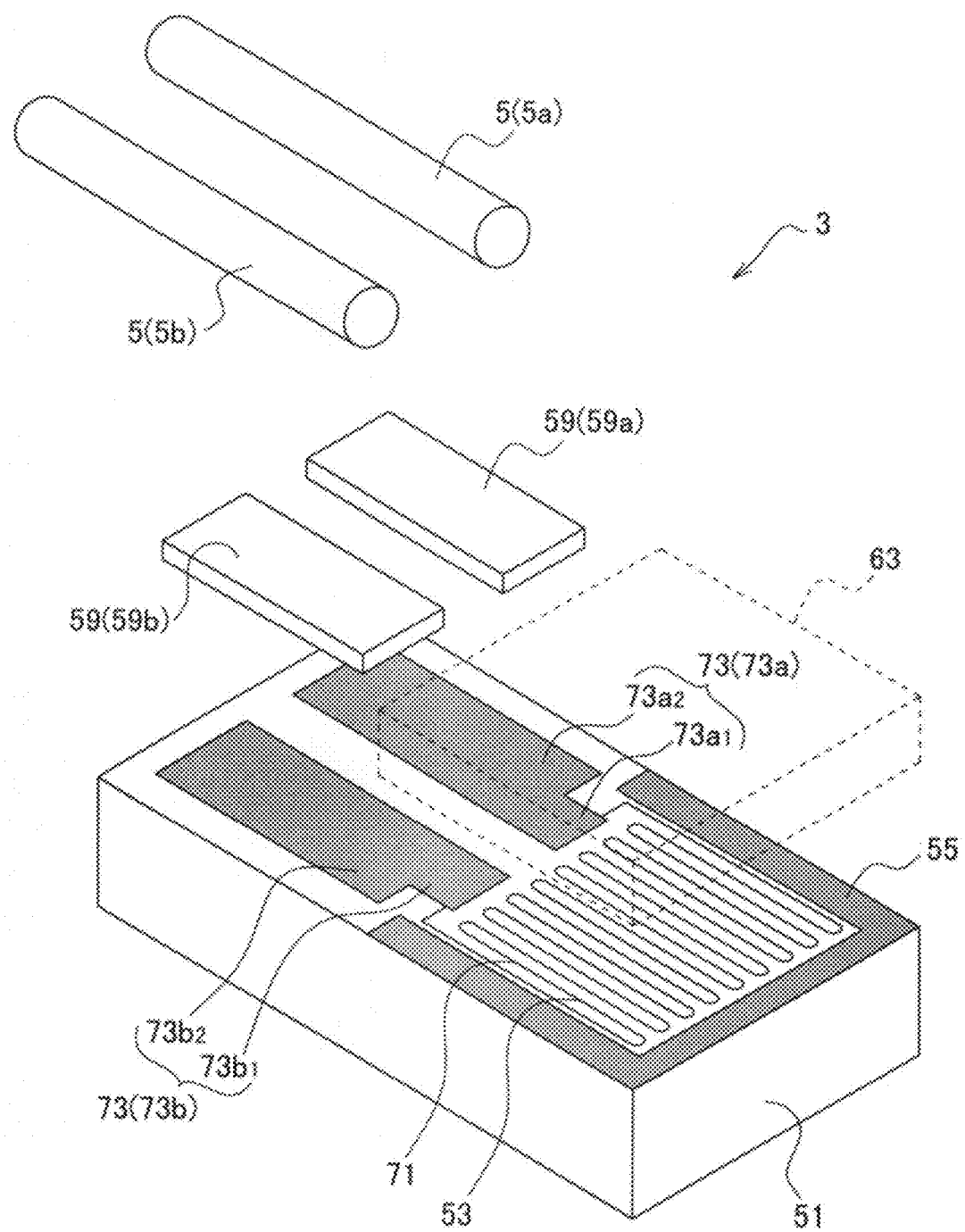
FIG. 3 is an exploded perspective view illustrating the temperature sensitive element.

FIG. 3 is an exploded perspective view of the temperature sensitive element. In FIG. 3, the temperature sensitive element shown is exploded with the covering member removed and with the ceramic covering layer illustrated as transparent.

As shown in FIGS. 2 and 3, the temperature sensitive element 3 includes a ceramic substrate 51 (ceramic base 51), a metallic resistor layer 53, a volatilization suppressing layer 55, a pair of pads 59a and 59b (collectively referred to as pads 59), a pair of output lines 5a and 5b (collectively referred to as output lines 5), the ceramic covering layer 63, and the covering member 65.

The metallic resistor layer 53 is formed on one of the main faces of the ceramic substrate 51 (the upper main face in FIG. 2(a)). The volatilization suppressing layer 55 is formed on the same main face of the ceramic substrate 51 as that on which the metallic resistor layer 53 is formed. The pair of pads 59a and 59b are formed on the rear end side (the left side in FIG. 2(a)) of the same main face of the ceramic substrate 51 as that on which the metallic resistor layer 53 is formed, in such a manner that the pair of pads 59a and 59b are formed on part of the surface of the metallic resistor layer 53.

The pair of output lines 5a and 5b are joined to the surfaces of the pads 59. The ceramic covering layer 63 covers the upper side (the upper side in FIG. 2(a)) of the forward end portion of the metallic resistor layer 53. The covering member 65 covers the forward ends of the output lines 5, the pair of pads 59, etc.

The temperature sensitive portion 4 is a plate-shaped portion of the temperature sensitive element 3 except for the output lines 5.

Each of the components will next be described.

The ceramic substrate 51 is a rectangular plate (in plan view) formed of, for example, alumina with a purity of 99.9%.

The metallic resistor layer 53 is an electrically conductive thin film formed from a metallic resistor (e.g., Pt) and has a thickness of, for example, 0.5 to 3.0 μm. The metallic resistor layer 53 includes a fine-line portion 71 on the forward end side and a pair of terminal portions 73a and 73b (collectively referred to as terminal portions 73) on the rear end side.

The fine-line portion 71 of the metallic resistor layer 53 is a fine line with a small line width (e.g., a width of 20 μm) and is formed so as to meander a plurality of times within a region covered with the ceramic covering layer 63.

The terminal portions 73 are terminals (larger in width than the fine-line portion 71) connected to a pair of rear ends of the fine-line portion 71 and formed so as to extend toward the rear end side.

Specifically, the terminal portions 73 are configured to include rectangular terminal forward end portions 73$a$1 and 73$b$1 (connected to the fine-line portion 71) on the forward end side and rectangular terminal rear end portions 73$a$2 and 73$b$2 on the rear end side. The terminal rear end portions 73$a$2 and 73$b$2 are terminals larger in width (the Y-directional dimension in FIG. 2($b$)) and area than the terminal forward end portions 73$a$1 and 73$b$1.

The volatilization suppressing layer 55 is a layer formed of the same material as that of the metallic resistor layer 53 and having the same thickness as that of the metallic resistor layer 53 and is formed so as to surround three sides (a side on the forward end side and opposite sides in the width direction (Y direction)) of the fine-line portion 71 of the metallic resistor layer 53 in the same plane as the plane of the metallic resistor layer 53. Therefore, the volatilization suppressing layer 55 generates platinum vapor pressure as a result of vaporization of platinum forming this layer, whereby vaporization or volatilization of the material of the metallic resistor layer 53 is suppressed.

The pads 59 are rectangular (in plan view), electrically conductive layers formed on the surfaces of the terminal rear end portions 73$a$2 and 73$b$2 in such a manner that their outer circumferences are located slightly inwardly of the outer circumferences of the terminal rear end portions 73$a$2 and 73$b$2. Each of the pads 59 is a thick film (having a thickness of, for example, 1 to 30 μm) thicker than the metallic resistor layer 53.

The pads 59 are formed of a material mixture of Pt and glass. The ratio between the Pt and the glass is such that the amount of glass is 40 vol % when the total amount of Pt and glass is set to 100 vol %. The ratio between the Pt and the glass may be such that, when the total amount of Pt and glass is set to 100 vol %, the amount of glass is within the range of 5 vol % to 80 vol % (preferably 10 vol % to 50 vol %).

The pads 59 may be formed using a material other than the material mixture of Pt and glass, specifically using a glass-based material prepared by adding, for example, a ceramic filler etc. to a metal and glass (a glass-based material formed mainly of the metal and the glass).

The glass contained in the pads 59 is, for example, high heat-resistant glass having a transition point of 700° C. or higher and a softening point of 900° C. or higher, and the composition of the high heat-resistant glass is, for example, $SiO_2$: 52 wt %, CaO: 25 wt %, $Al_2O_3$: 15 wt %, and SrO: 8 wt %.

The glass used has a thermal expansion coefficient smaller than the thermal expansion coefficient of the output lines 5. The glass used may be any of various types of glass having a thermal expansion coefficient smaller than the thermal expansion coefficient of the output lines 5, and these various types of glass include silicate glass, aluminosilicate glass, borate glass, borosilicate glass, and phosphosilicate glass.

The thermal expansion coefficient of the pads 59 is within the range of, for example, $6.0 \times 10^{-6}/°$ C. to $9.5 \times 10^{-6}/°$ C. in the operating temperature range of the temperature sensor 1 (e.g., 20 to 300° C.) and is set to be smaller than the thermal expansion coefficient of the output lines 5.

The difference in thermal expansion coefficient (the thermal expansion coefficient difference) between the output lines 5 and the pads 59 is, for example, $2.0 \times 10^{-6}/°$ C. The thermal expansion coefficient difference between the output lines 5 and the pads 59 may be any value within the range of, for example, $0.2 \times 10^{-6}/°$ C. to $4.0 \times 10^{-6}/°$ C. (more preferably within the range of $0.4 \times 10^{-6}/°$ C. to $2.5 \times 10^{-6}/°$ C.).

Each of the output lines 5 is formed from a Pt wire material (Pt wire) having a thermal expansion coefficient of $9.5 \times 10^{-6}/°$ C. (20-300° C.), and the forward ends of the output lines 5 are joined to the surfaces of the pads 59. A Pt alloy may be used for the output lines 5.

These output lines 5 are joined to the pads 59 by parallel welding (resistance welding), and therefore joint portions 75 between the output lines 5 and the pads 59 (see FIG. 2($a$)) are formed into a spot shape.

The ceramic covering layer 63 is a substrate formed of, for example, alumina with a purity of 99.9%. The ceramic covering layer 63 covers the fine-line portion 71 of the metallic resistor layer 53, the forward end portions of the terminal forward end portions 73$a$1 and 73$b$1 of the metallic resistor layer 53, and the volatilization suppressing layer 55.

The ceramic covering layer 63 is joined to the ceramic substrate 51 etc. through a junction layer 64 (see FIG. 2($a$)) formed of, for example, alumina with a purity of 99.9%.

The covering member 65 is a covering layer formed of a material mixture (mixture) of aluminosilicate glass and alumina and is formed so as to cover forward end portions of the output lines 5, the entire pads 59, and a rear end portion of the ceramic covering layer 63. Particularly, the covering member 65 is disposed on the pads 59 so as to cover at least portions of the output lines 5 that are located on the pads 59.

The aluminosilicate glass contained in the covering member 65 is, for example, high heat-resistant glass having a transition point of 700° C. or higher and a softening point of 900° C. or higher, and the composition of the high heat-resistant glass is, for example, $SiO_2$: 58 wt %, CaO: 17 wt %, $Al_2O_3$: 20 wt %, and MgO: 5 wt %. In the aluminosilicate glass in the covering member 65, the content of alkali metal elements, which are unavoidable impurities, is 0.2 wt % or less. Therefore, the aluminosilicate glass in the covering member 65 contains substantially no alkali metal elements.

The volume ratio of the alumina to the aluminosilicate glass (the alumina/the aluminosilicate glass) in the covering member 65 is 30 vol %/70 vol %.

The thermal expansion coefficient of the covering member 65 is $7.5 \times 10^{-6}/°$ C. (20-300° C.), and this is equal to or lower than the thermal expansion coefficient of the output lines 5. The covering member 65 is smaller in thermal expansion coefficient than the output lines 5, and the difference in thermal expansion coefficient between the output lines 5 and the covering member 65 is $2.0 \times 10^{-6}/°$ C. The difference in thermal expansion coefficient between the output lines 5 and the covering member 65 can be controlled within a prescribed range by adjusting the ratio and type of the ceramic mixed into the covering member 65.

As described above, the thermal expansion coefficient of the pads 59 is set to be smaller than the thermal expansion coefficient of the output lines 5.

1-3. Method of Producing Temperature Sensitive Element

A method of producing the temperature sensitive element 3 will next be described.

Figure 4:
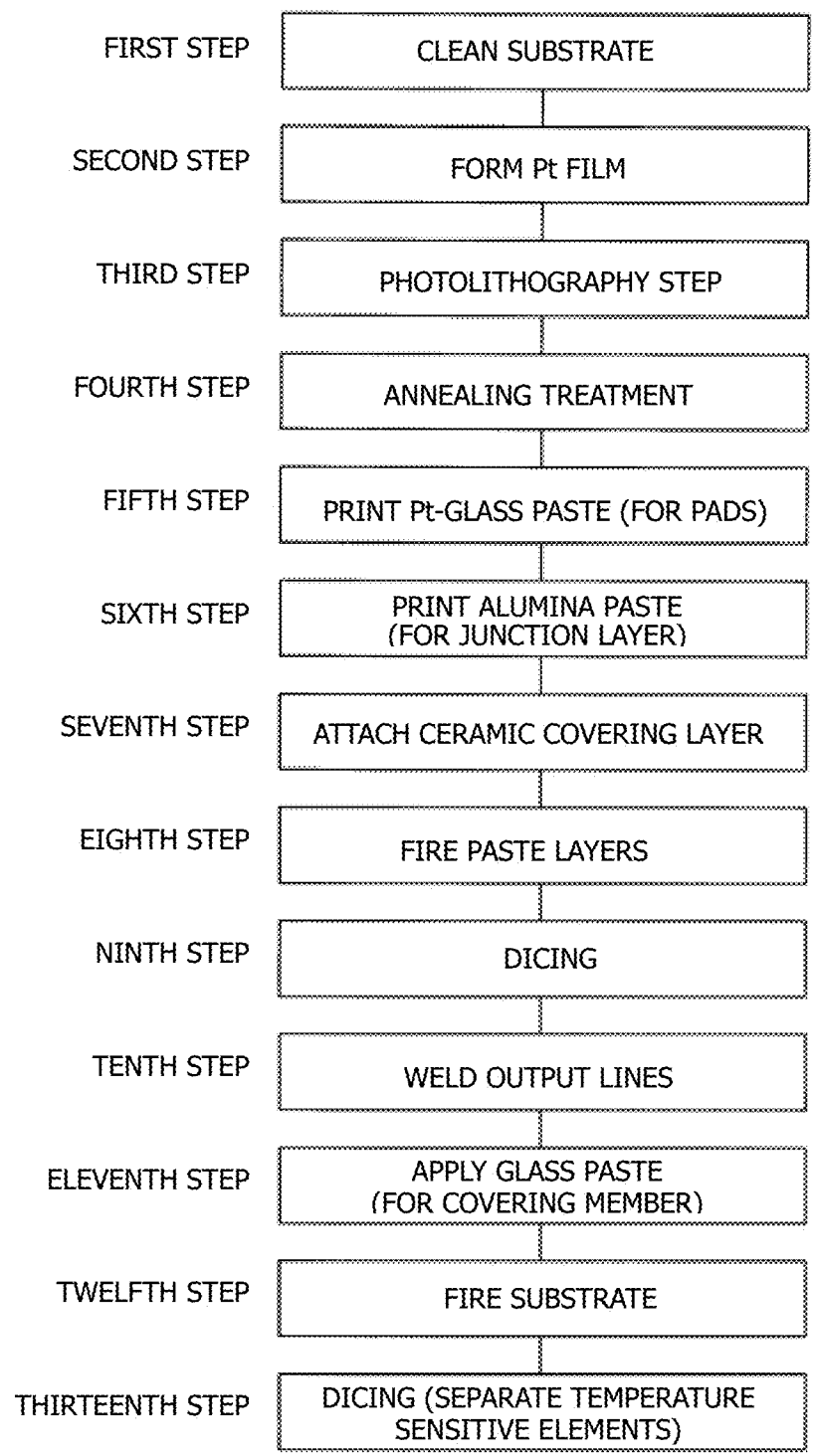
FIG. 4 is a diagram showing a process of producing the temperature sensitive element step-by-step.

FIG. 4 is a diagram showing the process of producing the temperature sensitive element step-by-step. FIGS. 5($a$) through 5($c$) are plan views illustrating the procedure of producing the temperature sensitive element.

Figure 5A:
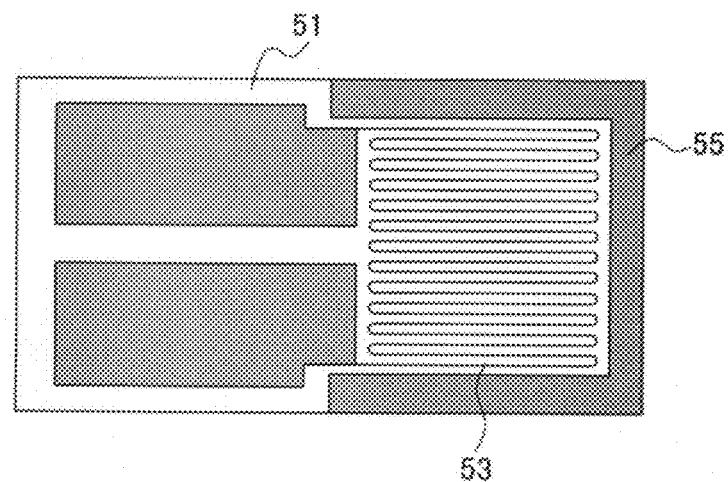
FIGS. 5(a) through 5(c) are plan views illustrating the procedure of producing the temperature sensitive element.
Figure 5B:
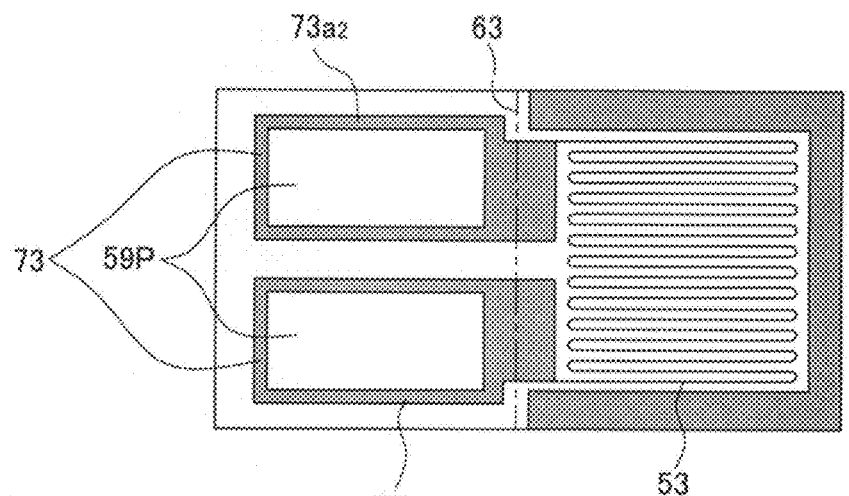
Figure 5C:
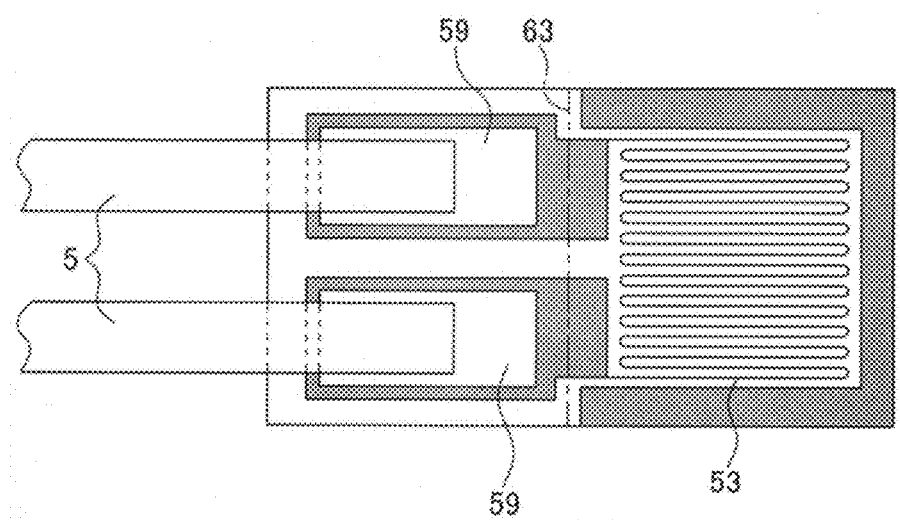
Figure 9:
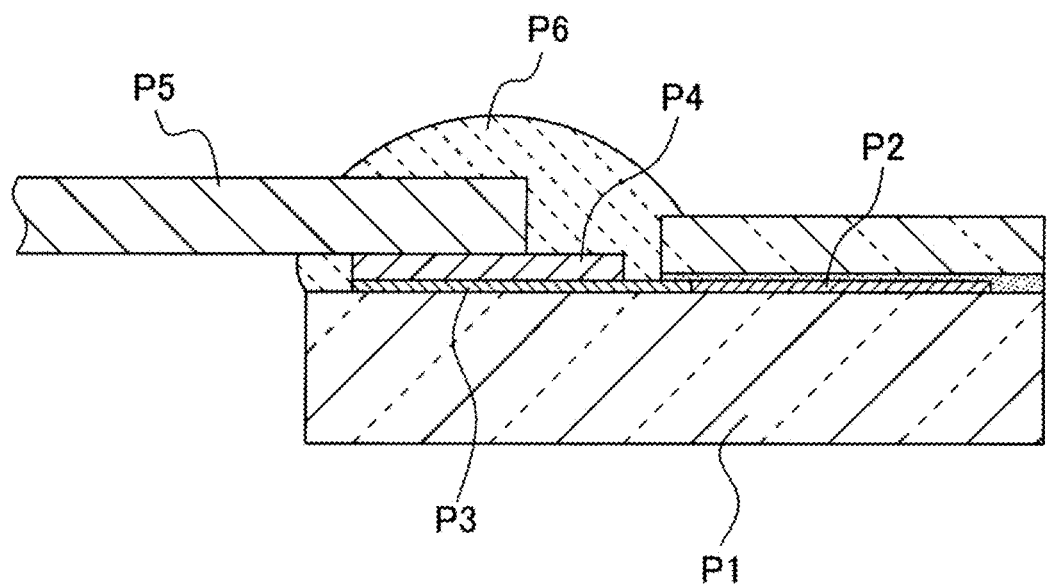
FIG. 9 is a diagram illustrating the internal structure of a conventional temperature sensitive element.

As shown in FIG. 4 and FIGS. 5($a$) through 5($c$), first, a base material (not shown) for ceramic substrates 51 is ultrasonically cleaned in a first step. The base material is a plate-shaped material used to produce a plurality of temperature sensitive elements 3 from one large-sized substrate, and the plate-shaped material includes a plurality of ceramic substrates 51. FIGS. 5(a) through 5(c) shows a portion corresponding to one temperature sensitive element 3.

Next, in a second step, a Pt film (not shown) is formed on part of the surface of the base material (i.e., each ceramic substrate 51) by a well-known PVD method (e.g., a sputtering method), in order to form the metallic resistor layer 53 and the volatilization suppressing layer 55. Specifically, the Pt film is formed on surface portions on which the metallic resistor layer 53 and the volatilization suppressing layer 55 are to be formed.

Next, in a third step, the metallic resistor layer 53 and the volatilization suppressing layer 55 are formed using a well-known photolithograph process including formation of a resist film, light-exposure treatment, development, etching, removal of the resist film, etc., as shown in FIG. 5(a).

Next, in a fourth step, annealing treatment (aging treatment) is performed. In the annealing treatment, the base material is heated to 1,000 to 1,400° C. in air or a $N_2$ atmosphere, and is left to cool.

Next, in a fifth step, for example, 10 parts by mass of a cellulosic resin is added to 100 parts by mass of a mixture of 93 parts by mass of a Pt material (powder) and 7 parts by mass of glass powder having the above-described composition. Then a Pt-glass paste 59P is produced using the above-prepared material such that the Pt-glass paste 59P has a composition corresponding to that of the pads 59.

Next, as shown in FIG. 5(b), the Pt-glass paste 59P is applied, by means of printing, to areas where the pads 59 are to be formed. Specifically, the Pt-glass paste 59P is applied, by means of printing, to the surfaces of the terminal rear end portions 73a2 and 73b2 of the terminal portions 73 of the metallic resistor layer 53 (within regions inside the outer circumferences of the terminal rear end portions 73a2 and 73b2) to form rectangular paste layers.

Next, in a sixth step, 90 parts by mass of alumina power is added to 10 parts by mass of a butyral resin to produce an alumina paste (not shown), and the alumina paste is applied, by means of printing, to an area on the base material (i.e., the ceramic substrate 51) that is to be covered with the ceramic covering layer 63 (an area where the junction layer 64 is to be formed).

Next, in a seventh step, the ceramic covering layer 63 (which is a fired ceramic substrate) is overlaid on the printed alumina paste layer, as shown in FIG. 5(b) (the ceramic covering layer 63 is illustrated as transparent).

Next, in an eighth step, the base material (the ceramic substrate 51) with the above-described layers etc. disposed on its surface is fired at a firing temperature of 1,000 to 1,400° C. for 2 hours, whereby the paste layers are fired.

Next, in a ninth step, the base material is diced into substrates having a work size suitable for welding described later.

Next, in a tenth step, as shown in FIG. 5(c), output lines 5 are placed on the pads 59 and joined thereto by parallel welding (resistance welding).

Next, in an eleventh step, 60 parts by mass of a glass material (powder) having a composition corresponding to that of the covering member 65, 40 parts by mass of an alumina material (powder), and 10 parts by mass of a butyral resin are mixed to produce a glass-alumina mixed paste (not shown), and the paste is applied to an area where the covering member 65 is to be formed. Specifically, the paste is applied so as to cover forward end portions of the output lines 5, the pads 59, and a rear end portion of the ceramic covering layer 63.

Next, in a twelfth step, each substrate with the work size is fired at a firing temperature of, for example, 1,000 to 1,400° C. for 2 hours.

Next, in a thirteenth step, the substrate with the work size is diced to separate temperature sensitive elements 3 from each other.

The temperature sensitive elements 3 can be produced through the steps described above.

A temperature sensor 1 can be produced by installing a temperature sensitive element 3, which has been produced in the manner described above, in a conventional manner.

1-4. Measurement Test

First, a description will be given of the results of a measurement test for strengths (initial strength and post-endurance test strength) of holding the output lines held by the covering member of a temperature sensitive element.

The present measurement test was performed using temperature sensitive elements each including a covering member formed from a material mixture (mixture) of alumina and aluminosilicate glass and temperature sensitive elements each including a covering member formed from a material mixture (mixture) of cordierite and aluminosilicate glass. Specifically, the measurement test was performed using eight types of temperature sensitive elements (samples 1 to 8) having different volume ratios of the alumina to the aluminosilicate glass and eight types of temperature sensitive elements (samples 9 to 16) having different volume ratios of the cordierite to the aluminosilicate glass. FIG. 6 shows the volume ratio of the alumina to the aluminosilicate glass or the volume ratio of the cordierite to the aluminosilicate glass in each temperature sensitive element.

In the present measurement test performed on each temperature sensitive element 3, a load in the direction in which the output lines 5 were to be pulled out of the covering member 65 was applied to the output lines 5 with the ceramic substrate 51 and the ceramic covering layer 63 being held, and the load was gradually increased. The load was increased until breakage (rupture) occurred somewhere in portions of the output lines 5 that were not covered with the covering member 65 or the output lines 5 came off the covering member 65. The present measurement test was performed using a method according to a metal material tensile test (JIS Z2241:2011). In the present measurement test, 10 temperature sensitive elements were used for each type of sample.

The test for the "initial strength" is a measurement test on a temperature sensitive element before this temperature sensitive element is held in an environment of 950° C. in a high-temperature furnace for 50 hours, and the test for the "post-endurance test strength" is a measurement test on the temperature sensitive element after the temperature sensitive element is held in an environment of 950° C. in the high-temperature furnace for 50 hours.

FIG. 6 shows the results of the measurement test. The test results show the strength of holding the output lines held by the covering member in three levels, very good (AA), good (A), and unacceptable (X).

Test results were judged as very good (AA) when, in all the ten temperature sensitive elements, "the output lines 5 did not come off the covering member 65 and breakage (rupture) occurred in the portions of the output lines 5 that were not covered with the covering member 65."

Test results were judged as good (A) when, in at least one out of the ten temperature sensitive elements, "the output lines 5 came off the covering member 65 but the load when the output lines 5 came off was equal to or greater than a required load (150 MPa in the present measurement test)"

and, in the other temperature sensitive elements, "the output lines 5 did not come off the covering member 65 and breakage (rupture) occurred in the portions of the output lines 5 that were not covered with the covering member 65."

Test results were judged as unacceptable (X) when, in at least one out of the ten temperature sensitive elements, "the output lines 5 came off the covering member 65 and the load when the output lines 5 came off was less than the required load."

For samples 8 and 16 in which the results of the test for the "initial strength" were "X," the test for the "post-endurance test strength" was omitted.

As can be seen from the test results, when the amount of the ceramic component (alumina or cordierite) was 50 vol % or less, the results of the test for the initial strength were "very good" or "good." In this case, the covering member can hold the output lines. When the amount of the ceramic component (alumina or cordierite) was 3 vol % or more, the results of the test for the post-endurance test strength were "very good" or "good." In this case, coming off of the output lines can be restrained.

According to the test results, in a temperature sensitive element including a covering member in which the volume ratio of alumina to aluminosilicate glass (alumina/aluminosilicate glass) is set to a volume ratio within the range of 3 vol %/97 vol % to 50 vol %/50 vol %, the output lines are firmly held by the covering member. To allow the output lines to be held by the covering member more firmly, the volume ratio of the alumina to the aluminosilicate glass (the alumina/the aluminosilicate glass) may be set to a volume ratio within the range of 10 vol %/90 vol % to 40 vol %/60 vol % so that both the "initial strength" and the "post-endurance test strength" become strengths corresponding to those judged as "very good."

Next, using 16 types of temperature sensitive elements (samples 21 to 36) having different combinations of ceramic and glass components forming the covering member, the measurement test for the strengths (initial strength and post-endurance test strength) of holding the output lines held by the covering member was performed. FIG. 7 shows the ceramic and glass components in each of the 16 types of temperature sensitive elements.

In the present measurement test performed, the volume ratio of the ceramic component to the glass component (the ceramic component/the glass component) in the covering member was set to 30 vol %/70 vol % for all the 16 types of temperature sensitive elements.

The results of the test for the "initial strength" and "post-endurance test strength" were very good (AA) for all the 16 types of temperature sensitive elements.

Therefore, by setting the volume ratio of the ceramic component to the glass component (the ceramic component/the glass component) in the covering member to 30 vol %/70 vol %, the "initial strength" and the "post-endurance test strength" become very good, and the output lines can be restrained from coming off the covering member.

Therefore, according to the above test results, in a temperature sensitive element including a covering member in which the volume ratio of the ceramic component to the glass component (the ceramic component/the glass component) is set to 30 vol %/70 vol %, the output lines are firmly held by the covering member.

Next, a description will be given of the results of a measurement test for the relation between the content of alkali metal elements in the glass in the covering member and leakage current in the temperature sensitive element.

In the present measurement test, the temperature detected by a temperature sensitive element (sample 41) in which the glass in the covering member contained no alkali metal elements was used as the reference, and an error in measurement of the temperature detected by a temperature sensitive element (one of samples 42 to 44) in which the glass in the covering member contained alkali metal elements was measured.

In the present measurement test, a mixture of $Na_2O$ and $K_2O$ was used as the alkali metal elements.

FIG. 8 shows the results of the present measurement test. According to the test results, the measurement error was 0.5 [° C.] for sample 42 containing the alkali metal elements in an amount of 0.1 wt %, and the judgment result was "very good (AA)." For sample 43 containing the alkali metal elements in an amount of 0.2 wt %, the measurement error was 1.0 [° C.], and the judgment result was "good (A)." For sample 44 containing the alkali metal elements in an amount of 0.3 wt %, the measurement error was 2.0 [° C.], and the judgment result was "unacceptable (X)."

According to these test results, when the content of the alkali metal elements in the glass in the covering member is 0.2 wt % or less (inclusive of 0 wt %) (i.e., the glass in the covering member contains substantially no alkali metal elements), an increase in the electric conductivity of the covering member can be restrained. Specifically, by setting the content of the alkali metal elements in the glass in the covering member to 0.2 wt % or less (inclusive of 0 wt %), the occurrence of leakage current through the covering member can be restrained, and a reduction in temperature detection accuracy of the temperature sensitive element can be restrained.

In the present measurement test, the alkali metal elements used were a mixture of $Na_2O$ and $K_2O$, but $Na_2O$ only or $K_2O$ only may be used. Also in such a case, by setting the content of the alkali metal elements to 0.2 wt % or less (inclusive of 0 wt %), the occurrence of leakage current through the covering member can be restrained. The alkali metal elements are not limited to Na and K. Even when other alkali metal elements are used, the occurrence of leakage current through the covering member can be restrained by setting the content of the alkali metal elements to 0.2 wt % or less (inclusive of 0 wt %).

1-5. Effects

As described above, the temperature sensitive element 3 in the temperature sensor 1 of the present embodiment includes the covering member 65 formed of a material mixture of alumina and aluminosilicate glass, and the volume ratio of the alumina to the aluminosilicate glass (the alumina/the aluminosilicate glass) in the covering member 65 is 30 vol %/70 vol %. The aluminosilicate glass contained in the covering member 65 is high heat-resistant glass with a softening point of 900° C. or higher.

In the temperature sensitive element 3, the covering member 65 contains the alumina and the aluminosilicate glass at the above volume ratio. Therefore, even at a temperature at which the aluminosilicate glass softens (or melts), the presence of the alumina allows the covering member 65 to maintain its shape when the alumina does not soften at this temperature. Specifically, this covering member 65 can hold the output lines 5 and the pads 59 and can restrain separation of the output lines 5 from the pads 59 and separation of the pads 59 from the ceramic substrate 51 even in an environment of higher temperature as compared with the case where the covering member is formed of the aluminosilicate glass only.

The softening point (melting point) of the aluminosilicate glass in the covering member 65 is 900° C. or higher. Therefore, the covering member 65 can hold the output lines 5 and the pads 59 at a temperature of 900° C. or higher, so long as the alumina does not soften at this temperature, and separation of the output lines 5 from the pads 59 and separation of the pads 59 from the ceramic substrate 51 can be restrained.

Therefore, in the temperature sensitive element 3, softening of the covering member 65 can be restrained, and the possibility of separation of the output lines 5 from the pads 59 can be reduced.

In the temperature sensitive element 3, the content of the alkali metal elements in the aluminosilicate glass in the covering member 65 is 0.2 wt % or less; i.e., the aluminosilicate glass contains substantially no alkali metal elements.

If the aluminosilicate glass in the covering member 65 contains a large amount of alkali metal elements, the electric conductivity of the covering member 65 becomes high. In this case, leakage current may flow through the covering member 65, so that the possibility of a reduction in the temperature detection accuracy of the temperature sensitive element 3 increases.

However, when the aluminosilicate glass in the covering member 65 contains substantially no alkali metal elements, an increase in the electric conductivity of the covering member 65 can be restrained, so that a reduction in the temperature detection accuracy of the temperature sensitive element 3 can be restrained.

In the temperature sensitive element 3, the thermal expansion coefficient of the covering member 65 is smaller than the thermal expansion coefficient of the output lines 5.

In this temperature sensitive element 3, the amount of expansion due to a temperature change is smaller in the covering member 65 than in the output lines 5.

Therefore, the covering member 65 is less likely to deform than the output lines 5 even in a high temperature environment, and the covering member 65 can hold the output lines 5 and the pads 59, so that separation of the output lines 5 from the pads 59 and separation of the pads 59 from the ceramic substrate 51 can be restrained.

The temperature sensor 1 includes the temperature sensitive element 3 described above. Therefore, even when the temperature sensor 1 is used at a high temperature of, for example, 850° C. or higher, softening of the covering member 65 can be restrained, and separation (separation of the output lines 5 from the pads 59 and separation of the pads 59 from the ceramic substrate 51) in the temperature sensitive element 3 can be restrained. Therefore, the temperature sensor 1 has an advantage in that it has high high-temperature endurance and can be preferably used at high temperature.

1-6. Correspondence with Claims

A description will be given of the correspondence between terms used in the present embodiment and terms used in claims.

The temperature sensitive element 3 corresponds to the temperature sensitive element in the claims. The ceramic substrate 51 corresponds to the ceramic substrate in the claims. The metallic resistor layer 53 corresponds to the metallic resistor layer in the claims. The pads 59 (the pads 59a and 59b) correspond to the pad in the claims. The output lines 5 (the element electrode lines 5, the output lines 5a and 5b) correspond to the output line in the claims. The covering member 65 corresponds to the covering member in the claims.

The temperature sensor 1 corresponds to the temperature sensor in the claims. The cement 23 and the metal tube 9 correspond to the holding portion in the claims. The mounting portion 11 and the nut portion 13 correspond to the mounting portion in the claims.

2. Other Embodiments

The embodiment of the present invention has been described, but the present invention is not limited to the above-described embodiment. The present invention can be implemented in various forms without departing from the spirit of the invention.

For example, in the embodiment described above, the volume ratio of the alumina to the aluminosilicate glass (the alumina/the aluminosilicate glass) in the covering member 65 is 30 vol %/70 vol %. However, the volume ratio is not limited to this value.

Specifically, according to the measurement results shown in FIG. 6, the volume ratio of the alumina to the aluminosilicate glass (the alumina/the aluminosilicate glass) in the covering member 65 may be any volume ratio within the range of 3 vol %/97 vol % to 50 vol %/50 vol %.

When the volume ratio of the alumina to the aluminosilicate glass (the alumina/the aluminosilicate glass) in the covering member 65 is within the range of 10 vol %/90 vol % to 40 vol %/60 vol %, the presence of the alumina can further allow the covering member 65 to maintain its shape even in a high temperature environment. This covering member 65 can hold the output lines 5 and the pads 59 more firmly even in a high temperature environment, and separation of the output lines 5 from the pads 59 and separation of the pads 59 from the ceramic substrate 51 can be restrained.

In the description of the above embodiment, the covering member 65 is formed of a material mixture of alumina and aluminosilicate glass. However, the covering member may be formed of a material mixture of another ceramic component and another glass component. Specifically, the covering member may be formed using any of the material mixtures of ceramic components and glass components shown in samples 9 to 16 in FIG. 6 and samples 21 to 36 in FIG. 7.

The volume ratio of the ceramic component to the glass component (the ceramic/the glass) in the above covering member is not limited to 30 vol %/70 vol %. The volume ratio of the ceramic component to the glass component (the ceramic/the glass) in the covering member may be any volume ratio within the range of 3 vol %/97 vol % to 50 vol %/50 vol % and is more preferably any volume ratio within the range of 10 vol %/90 vol % to 40 vol %/60 vol %.

The materials of the components (e.g., the ceramic substrate, the metallic resistor layer, the output lines, the covering member, etc.) forming the temperature sensitive element are not limited to the materials described above, and any of various known materials may be used within the technical scope of the present invention.

The structure of the temperature sensor that contains the temperature sensitive element is not limited to the structure described above, and any of various known structures of temperature sensors may be used.

DESCRIPTION OF REFERENCE NUMERALS

1: temperature sensor,
3: temperature sensitive element,
5: output line (element electrode line), 7: sheath portion,
9: metal tube,
11: mounting portion,
13: nut portion,
15: metal core wire (sheath core wire),
17: sleeve,
23: cement (holding member),
51: ceramic substrate (ceramic base),
53: metallic resistor layer,
55: volatilization suppressing layer,
59: pad,
63: ceramic covering layer,
65: covering member,
73: terminal portion

What is claimed is:

1. A temperature sensitive element comprising:
a ceramic substrate;
a metallic resistor layer formed on the ceramic substrate;
a pad formed on the ceramic substrate, the pad having electric conductivity and being electrically connected to the metallic resistor layer;
an output line formed of a metal and joined to a surface of the pad; and
a covering member that is disposed on the pad so as to cover at least a portion of the output line, the portion being located on the pad, wherein:
the covering member is formed of a mixture of a glass and a ceramic,
a volume ratio of the ceramic to the glass (the ceramic/the glass) in the covering member is within a range of 3 vol %/97 vol % to 30 vol %/70 vol %, and
a softening point or a melting point of the glass is 900° C. or higher.

2. The temperature sensitive element according to claim 1, wherein
the glass contains an alkali metal element in an amount of 0.2 wt % or less (inclusive of 0 wt %).

3. The temperature sensitive element according to claim 1, wherein
a thermal expansion coefficient of the covering member is equal to or lower than a thermal expansion coefficient of the output line.

4. The temperature sensitive element according to claim 1, wherein
the volume ratio of the ceramic to the glass (the ceramic/the glass) in the covering member is within the range of 10 vol %/90 vol % to 30 vol %/70 vol %.

5. A temperature sensor comprising:
the temperature sensitive element according to claim 1;
a holding portion for holding the temperature sensitive element; and
a mounting portion for mounting the temperature sensitive element and the holding portion to a mount portion.

* * * * *